Figure 1:
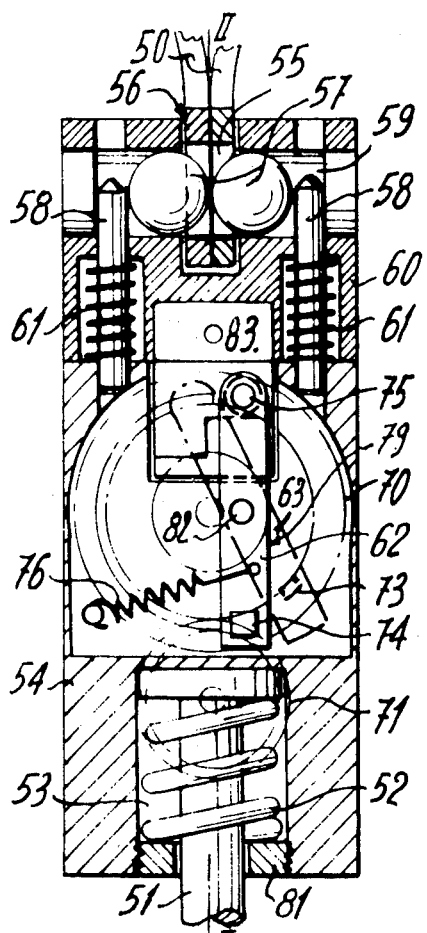

United States Patent [19]

Bouju

[11] 4,049,293
[45] Sept. 20, 1977

[54] SEAT BELT SECURITY RELEASE MECHANISM

[76] Inventor: Michel Bouju, Case Postale 2286, Lausanne, Switzerland

[21] Appl. No.: 671,039

[22] Filed: Mar. 29, 1976

[30] Foreign Application Priority Data

July 17, 1975 Switzerland .......................... 9478/75
Nov. 4, 1975 Switzerland ........................ 14233/75

[51] Int. Cl.² ........................................ B60R 21/10
[52] U.S. Cl. .............................. 280/744; 24/230 AL
[58] Field of Search ............ 280/744, 745; 24/230 A, 24/230 AL, 230 AN, 230 AT, 211 K, 211 L, 211 R; 297/385

[56] References Cited

U.S. PATENT DOCUMENTS

| 3,146,027 | 8/1964  | Winberg  | 24/230 AL |
| 3,235,930 | 2/1966  | Chapin   | 24/230 A  |
| 3,241,205 | 3/1966  | Genin    | 280/744   |
| 3,500,510 | 3/1970  | Gaione   | 24/230 AL |
| 3,846,876 | 11/1974 | Weman    | 24/230 A  |
| 3,961,680 | 6/1976  | Miescher | 280/744   |
| 3,963,090 | 6/1976  | Hollins  | 280/744   |

FOREIGN PATENT DOCUMENTS 2,030,096 12/1969 France .............................. 24/230 A Primary Examiner—Robert R. Song
Attorney, Agent, or Firm—Raymond A. Robic; Arthur Schwartz; Francis B. Francois

[57] ABSTRACT

An automobile seat belt has a security release mechanism producing automatic opening of the belt after a given delay following an impact. Ends of the belt carry an attachment locked in a slot by two balls held in an opening of the attachment by retractable pins. Retraction of the pins to free the balls and hence the belt is controlled by a clockwork triggered by a spring when the belt tension exceeds a given value.

6 Claims, 4 Drawing Figures

SEAT BELT SECURITY RELEASE MECHANISM

The invention relates to safety seat belts.

A problem with classic seat belts is that after automobile passengers have been safely retained during an impact, after the impact the belt may trap them in the automobile with the possible risks of being burnt, asphyxiated or drowned.

It has accordingly been proposed to provide a safety seat belt with a security release mechanism for connection between the seat belt and an anchoring means, with a view to producing automatic opening of the belt after a given time following an impact.

The invention relates to such a security mechanism of the type comprising a belt attachment member, a piece having a slot for receiving said member, means for locking said member in said slot, and means including a spring submitted to the belt tension transmitted by said attachment member for controlling delayed disengagement of said locking means to release said member after said tension has exceeded a given value.

An object of the invention is to provide an improved mechanism of this type including a simple and easily releasable locking means in combination with a simple and reliable release control means.

According to the invention, in a mechanism of the stated type said locking means comprises two balls disposed in housings in said piece adjacent part of said slot which receives the belt attachment member, said member having an opening which faces said housings when the member is located in the slot. At least one of the balls is movable away from the other into its housing, and at least one retractable abutment normally holds the movable ball against the other ball in said opening of the belt attachment member to lock it in the slot. The delayed-disengagement control means comprises means for retracting the abutment to allow said movable ball to move away from the other to free the belt attachment member, thereby releasing the safety belt.

Figure 2:
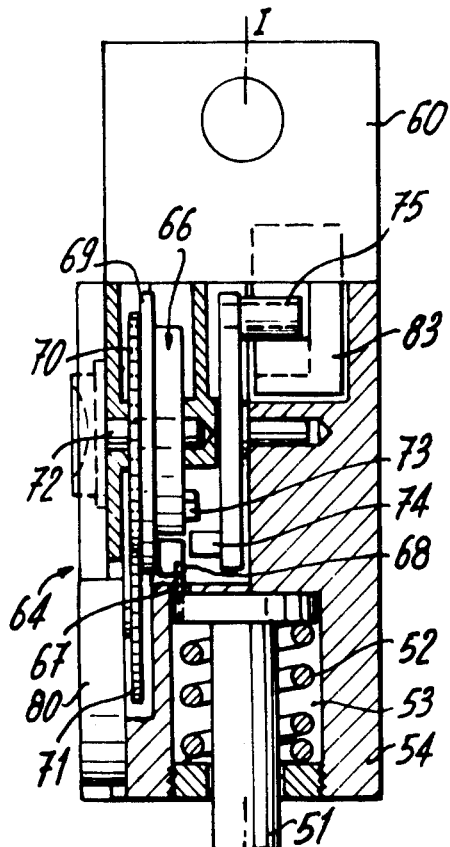
Figure 3:
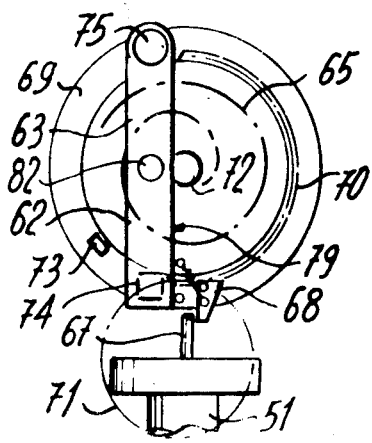
Figure 4:
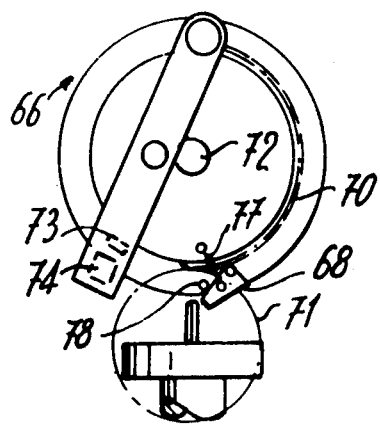

An embodiment of the invention is shown, by way of example, in the accompanying drawings, in which:

FIGS. 1 and 2 are cross-sections of the device, respectively along line I—I of FIG. 2 and line II—II of FIG. 1; and FIGS. 3 and 4 are partial schematic views illustrating operation of the device.

The device shown is inserted in a safety belt between the point of anchoring to the body of an automobile, and the corresponding double belt ends 50.

The device is secured to the anchor point by means of a piston 51 slidably mounted in a cylinder 52 in a piece 54 of the device. The piece 54 may move relative to piston 51 against the action of a spring 52 the force of which can be adjusted by means of a threaded ring 81.

The device is connected to the belt ends 50 by the intermediary of an attachment in the form of double plates 55 engaged side-by-side in a slot 56 in the upper part of a piece 60. Plates 55 are locked in slot 56 by two locking balls 57 housed in a transverse bore 59 of piece 60 and held together in openings of plates 55 by two abutment pins 58.

Pieces 54 and 60 are fitted together and guided by the pins 58 which are screwed in the upper part of piece 54 and engage in holes in piece 60 which lead into bore 59.

Springs 61 on the pins 58 tend to move piece 54 and 60 apart from one another and, consequently, withdraw the two pins 58 from bore 59 to permit the two balls 57 to move apart freely and hence allow withdrawal of plates 55 from slot 56.

In a central housing of piece 54 are mounted a trigger-forming lever 62 and a clockwork movement 64 for controlling this trigger. Lever 62, which is pivoted on a pin 82, has one arm 79 carrying an abutment 74 and another arm 63 carrying a roller 75 which rests on a cam 83 integral with piece 60 and locks the pieces 54 and 60 together in the position of FIGS. 1 and 2, in which position springs 61 are compressed. The purpose of movement 64 is to tip the trigger lever 62 into the position shown in a chain line in FIG. 1, in which roller 75 is freed from cam 83 whereupon the springs 61 can expand to separate piece 60 from piece 54 by an amount sufficient to free the balls 57 and unlock plates 55.

The energy required to tip lever 62 is provided by the potential energy stored by deforming the spring 65 of a barrel 66 of movement 64.

The automatic unlocking of plates 55, which enables the passengers of the vehicle to free themselves from their safety belts without having to open the conventional buckle-release mechanism, is only produced after an impact during which the belts have been submitted to a traction exceeding a given value, and the time delay is selected to correspond, for most accidents, to a moment when the vehicle will have been brought to a standstill. The delay time is set by movement 64 whose barrel 66 is previously wound up by means of a key or a coin.

The movement 64 is normally held stopped by abutment of a lever 68 pivoted on a plate 69 of the barrel frame, against a pin 67 projecting from piston 51. Lever 68 is pivotable between two stops and is biased by a spring 77 against one stop 78. Barrel 66 has a toothing 70 engaging with a first toothed wheel 71 of a conventional type of escapement 80 of the movement, allowing regular tooth-by-tooth rotation of barrel 66.

If either belt 50 is submitted to a tension above the critical value, the piston 51 compresses spring 52 by an amount sufficient for the lever 68 to disengage from finger 67, to allow the movement 64 to start up to provide a regulated clockwise rotation of the barrel from the initial position of FIG. 3.

The toothing 70 extends over an arc of 180° so that after a certain time -the delay time- corresponding to half a turn of the barrel 66, the toothing 70 disengages from wheel 71. The barrel 66 is thus no longer retained and the barrel spring 65 which is secured by its inner end to pin 72, abruptly relaxes, and rapidly turns the barrel 66 and its plate 69.

During this rotation, a striker or lug 73 of plate 69 comes to strike abutment 74, and tips the trigger lever 62 into its position shown in FIG. 4 and in a chain line in FIG. 1, FIG. 4 shows the elements as the lug 73 passes over pin 74 and lever 68, which meantime had come to abut against stop 78 under the action of spring 77, once more comes into abutment with finger 67 at the end of a rotation of barrel 66 to once more hold the barrel in its rest position.

To lock the device, the two parts 54 and 60 are placed into contact by replacing member 55 into slot 56 and pressing piece 60 down to compress springs 61, which permits trigger lever 62 to take up its initial locking position under the action of spring 76.

In principle, the barrel will be chosen so as to actuate the device even if it has not been fully wound up. However, for safety reasons, means could be provided for preventing the pieces 54 and 60 from being placed together so long as the barrel has not been fully wound up.

Also, it would be possible to envisage adjustment of the time delay by acting on one of the elements setting the escapement.

What is claimed is:

1. In a security release mechanism for connection between a safety seat belt and an anchoring means to produce automatic opening of the belt after a given time following an impact, comprising a belt attachment member, a first piece having a slot for receiving said member, means for locking said member in said slot, and means including a spring submitted to the belt tension transmitted by said attachment member for controlling delayed disengagement of said locking means to release said member after said tension has exceeded a given value, the improvement wherein said locking means comprises two balls disposed in housings in said first piece adjacent part of said slot which receives said member, said member having an opening which faces said housings when said member is located in said slot, at least one of said balls being movable away from the other into its housing, and at least one retractable abutment normally holding said movable ball against the other ball in said opening of said member to lock said member in said slot, said delayed-disengagement control means comprising means for retracting said abutment to allow said movable ball to move away from the other to free said belt attachment member.

2. A seat belt security release mechanism according to claim 1, in which said first piece is movably mounted on a second piece carrying said at least one abutment between a first position in which said at least one abutment holds the balls together in said opening and a second position in which said abutment frees the balls, and comprising at least one second spring biasing said first piece to said first position, and means on said second piece for releasably holding said first piece in its second position.

3. A seat belt security release mechanism according to claim 2, in which said holding means comprise a lever pivoted between a retaining position and a release position, said delayed-disengagement control means comprising means for abruptly moving said lever to its release position at the end of said delay.

4. A seat belt security release mechanism according to claim 3, in which said delayed-disengagement control means comprises energy storage means actuating a delay mechanism which comprises means for setting it going in response to a critical deformation of said first spring.

5. A seat belt security release mechanism according to claim 4, in which said energy storage means and said delay mechanism are formed by a clockwork movement.

6. A seat belt security release mechanism according to claim 5, in which said movement comprises a barrel rotated by a barrel spring, and means for allowing said barrel to slowly rotate during part of a revolution during said delay and thereafter allowing said barrel spring to abrutly rotate the barrel, said barrel carrying a striker for knocking said lever to its release position.

* * * * *